March 6, 1956
C. D. ARCHER
2,737,004
HARROW TOOTH MOUNT
Filed Nov. 14, 1952
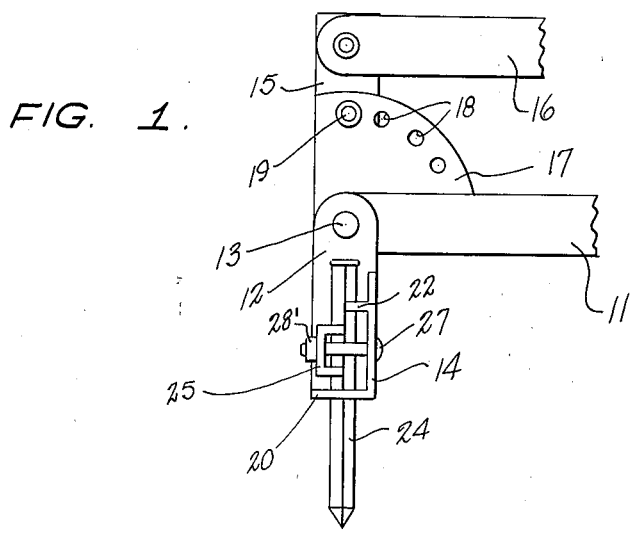
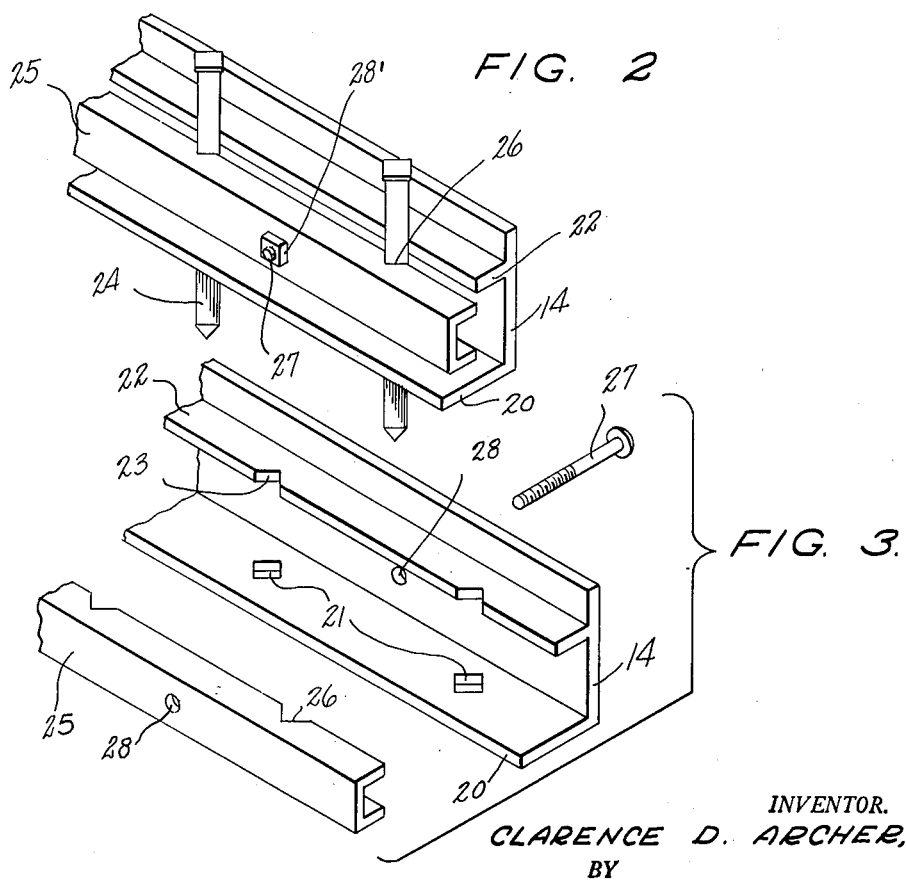
INVENTOR.
CLARENCE D. ARCHER,
BY
McMorrow, Berman & Davidson
ATTORNEYS.

United States Patent Office 2,737,004
Patented Mar. 6, 1956

2,737,004
HARROW TOOTH MOUNT

Clarence Dee Archer, Knights Landing, Calif.

Application November 14, 1952, Serial No. 320,481

1 Claim. (Cl. 55—94)

This invention relates to argicultural implements, and more particularly to an improvement in mounting means for drag harrow teeth.

A main object of the invention is to provide a novel and improved mounting means for securing harrow teeth in adjusted depending positions, the improved mounting means being simple in construction, being easy to manipulate, and securing the harrow teeth in desired adjusted positions vertically.

A further object of the invention is to provide an improved harrow teeth supporting means involving inexpensive components, the supporting means being sturdy in construction, and the improved structure allowing the harrow teeth to be set in desired depending positions relative to the main supporting frame thereof in a short period of time and with a small amount of labor.

Further objects and advantages of the invention will become apparent from the following description and claim, and from the accompanying drawings, wherein:

Figure 1 is a fragmentary side elevational view of a portion of a harrow frame employing improved harrow tooth-mounting means according to the present invention.

Figure 2 is a perspective view showing a pair of harrow teeth and the securing means therefor, forming part of the frame of Figure 1.

Figure 3 is a perspective view showing the harrow tooth-clamping means of Figure 2 in separated position.

Referring to the drawings, 11 designates a longitudinal frame element of a harrow frame provided with respective rows of transversely aligned depending arms 12, each row being pivoted to the frame elements 11 as at 13, and 14 designates one of respective transversely extending bars rigidly secured to the respective transverse rows of depending arms 12. The harrow frame may be provided with respective upstanding arms 15 rigidly secured to the respective transverse bars 14 intermediate the longitudinal side frame elements 11, the upstanding arms being pivotally connected to a link bar 16, whereby the transverse bars 14 are simultaneously rotatable around the respective transverse horizontal axes defined by the pivotal connections 13. An intermediate longitudinal frame bar may be provided which is formed with an upstanding vertical plate element 17, said plate element being provided with the apertures 18 located at equal radial distances from the pivotal connection 13 of the additional longitudinal frame bar to the adjacent upstanding arm 15, whereby the transverse bars 14 may be locked in desired angular positions by employing a locking bolt 19 which is engaged through a selected aperture 18 and the adjacent upstanding arm 15.

Each transverse bar 14 is formed with a horizontal bottom flange 20, said flange being formed with the spaced, square apertures 21, as is clearly shown in Figure 3. Each transverse bar 14 is formed with the upper horizontal flange 22, said horizontal flange 22 being relatively narrow in width, as compared with the bottom flange 20. The flanges 22 are formed with the spaced V-shaped notches 23 which are vertically aligned with the respective square openings 21, the openings 21 having their diagonals parallel to the transverse bars 14, as will be clearly apparent from Figure 3. Designated at 24 are respective spikes of square cross sectional shape which are adapted to be engaged in the apertures 21 and in the notches 23 thereabove, the spikes 24 being secured in adjusted vertical positions by transverse clamping bars 25, said clamping bars being channel-shaped and having their flanges formed with the V-shaped notches 26 adapted to engage the square spikes 24 in the manner illustrated in Figure 2. The channel bars 25 are clamped to the respective transverse bars 14 by bolts 27 engaged through apertures 28 in the transverse bars 14 and through the webs of the clamping bars 25, the bolts being provided with clamping nuts 28'.

The spikes 24 may be easily adjusted to desired depending positions and may be clamped in adjusted positions by tightening the nuts 28' on the bolts 27.

While a specific embodiment of an improved harrow spike supporting means has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a harrow tooth mount, a frame bar comprising a plate member extending in a generally horizontal direction and lying in a vertical plane, said member terminating at its lower edge in a flange of substantial width lying in a horizontal plane, and a second horizontal flange of narrower width spaced above said horizontal flange but below the upper edge of said vertical plate member, thereby providing a channel of substantial depth, the first flange having a row of non-circular openings extending substantially longitudinally and centrally thereof and the second flange having a row of notches formed in its outer edge, each of said notches being aligned vertically with an opening of said first named row, the edges of the notches being shaped identically to and being in registration with corresponding portions of the edges of the openings; spikes having a cross sectional shape corresponding to the shape of said openings, and extending vertically through the openings and notches; a clamping bar extending in parallelism to the frame bar, and including a web lying in a vertical plane and flanges on the upper and lower edges of the web, said clamping bar flanges having vertically aligned notches in their outer edges, the edges of the clamping bar notches being formed identically to and being aligned vertically with the remaining portions of the edges of said openings, the distance between the flanges of the clamping bar being substantially less than that between the flanges of the frame bar for disposition of the respective clamping bar flanges within said channel inwardly a substantial distance from the respective channel-defining first named flanges, the clamping bar web and plate member having horizontally aligned openings; and a connecting bolt extending through the last named openings to draw the plate member and clamping bar into gripping engagement with the several spikes.

References Cited in the file of this patent

UNITED STATES PATENTS

| | | |
|---|---|---|
| 217,320 | Beauregard | July 8, 1879 |
| 264,546 | Matteson | Sept. 19, 1882 |
| 467,068 | Waggoner | Jan. 12, 1892 |
| 691,660 | Poole | Jan. 21, 1902 |
| 776,394 | Haworth | Nov. 29, 1904 |
| 924,993 | Johnson | June 15, 1909 |
| 1,717,539 | Anderson | June 18, 1929 |